United States Patent
Law et al.

(10) Patent No.: US 7,076,121 B2
(45) Date of Patent: Jul. 11, 2006

(54) POLARIZATION CONTROLLER USING SPATIAL FILTERING

(75) Inventors: Joanne Y. Law, Sunnyvale, CA (US); Eric S. Johnstone, Redwood City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 157 days.

(21) Appl. No.: 10/637,276

(22) Filed: Aug. 8, 2003

(65) Prior Publication Data

US 2005/0031245 A1 Feb. 10, 2005

(51) Int. Cl.
*G02B 6/00* (2006.01)

(52) U.S. Cl. ............................... 385/11; 385/12; 385/13

(58) Field of Classification Search ................. 385/11, 385/12, 13, 14, 15, 16, 28, 32, 33, 39
See application file for complete search history.

(56) References Cited

U.S. PATENT DOCUMENTS

| | | | |
|---|---|---|---|
| 4,960,319 A | 10/1990 | Dankowych | |
| 5,124,828 A | 6/1992 | Mahon | |
| 5,191,387 A | 3/1993 | Ichikawa et al. | |
| 5,231,521 A * | 7/1993 | Johnson et al. | 349/18 |
| 5,274,385 A * | 12/1993 | Riza | 342/375 |
| 5,508,839 A | 4/1996 | Ono | |
| 5,600,474 A | 2/1997 | Tomesen et al. | |
| 6,266,457 B1 * | 7/2001 | Jacob | 385/11 |
| 6,460,997 B1 * | 10/2002 | Frey et al. | 351/211 |
| 6,549,283 B1 * | 4/2003 | Eckert | 356/369 |
| 6,721,467 B1 * | 4/2004 | Olson | 385/11 |
| 2002/0149757 A1 * | 10/2002 | Kelsey et al. | 355/71 |
| 2002/0186913 A1 * | 12/2002 | Olson | 385/11 |

OTHER PUBLICATIONS

Reinhold Noé, "Endless Polarization Control Systems for Coherent Optics", Journal of Lightwave Technology, vol. 6, No. 7, Jul. 1988, pp. 1199–1208.

"Endless Polarisation Controller Using Electro–Optic Waveplates", Electronics Letters, Mar. 31, 1988, vol. 24, No. 7, pp. 412–413.

* cited by examiner

*Primary Examiner*—Kianni Kaveh

(57) ABSTRACT

A method for improving polarization extinction ratio includes changing a polarization state of a light beam, wherein the light beam thereafter includes spatially non-uniform polarization states, and spatially filtering the light beam to filter out the spatially non-uniform polarization states. Spatial filtering involves filtering a wavefront of the light beam by passing the light beam through a polarization-maintaining single-mode fiber, or filtering an amplitude of the light beam by passing the light beam through an aperture.

22 Claims, 9 Drawing Sheets

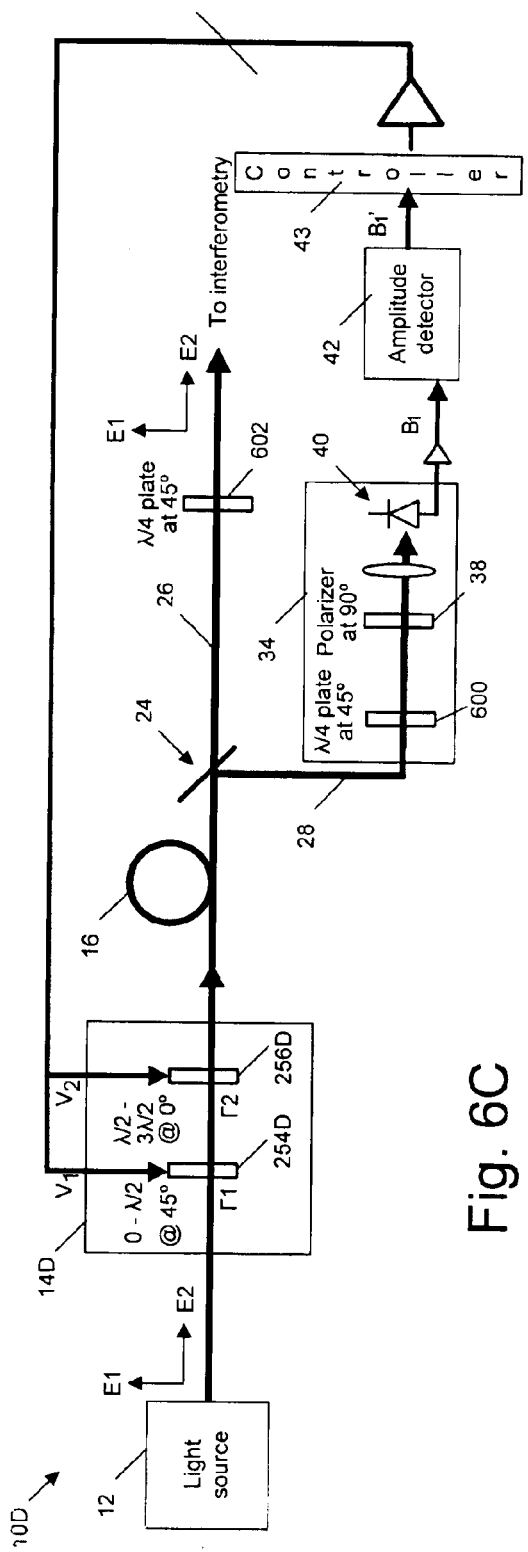
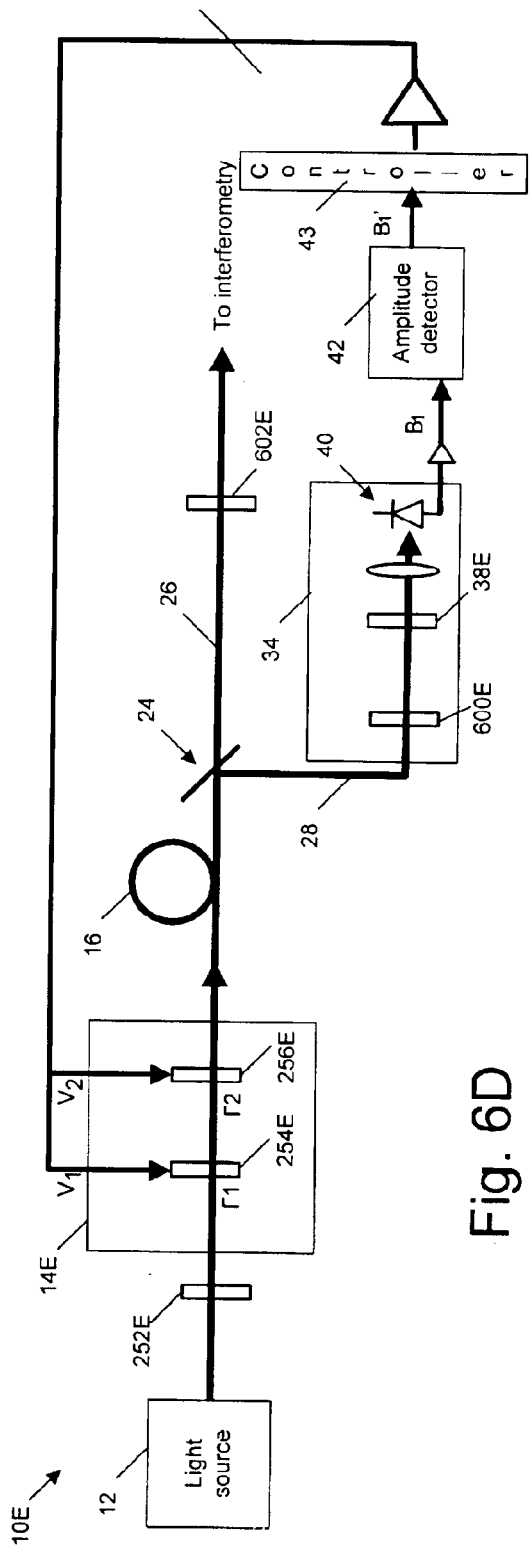
Fig. 6C
Fig. 6D

POLARIZATION CONTROLLER USING SPATIAL FILTERING

FIELD OF INVENTION

This invention relates to improving the polarization extinction ratio (PER) of a polarization-altering device whose PER is limited by spatial non-uniformity of its birefringent properties.

DESCRIPTION OF RELATED ART

In many applications, it is often necessary to change an input polarization state to a generally different output polarization state while maintaining a high polarization extinction ratio (PER). Examples of devices utilizing a change in polarization state directly or indirectly are polarization controllers, polarization state modulators, polarization scramblers, variable optical attenuators, and optical switches. Many of these devices employ a birefringent material such as liquid crystals, electro-optic crystals, and photoelastic modulators, to create a change in polarization. Polarization state of the incoming light is altered through a change in birefringent properties of the material in response to an external force, in most cases an applied electric field. By changing the applied field, the change in polarization can be controlled.

One of the main factors limiting the PER of the output polarization is spatial non-uniformity of birefringent properties of the material. Such non-uniformity can result from a number of factors such as intrinsic spatial inhomogeneity of the refractive index and non-uniform spatial distribution of the external field inducing the birefringence change. The result is an output beam with spatially non-uniform polarization properties, which limit the overall PER.

One solution to address the problem of intrinsic inhomogeneity is to choose a material with lower degree of inhomogeneity. However, these materials usually have other problems. For example, typical extinction ratio of potassium dihydrogen phosphate (KDP) exceeds 10,000:1, but they are soft and hygroscopic. Hence it would be desirable to come up with a general technique to improve PER of birefringent materials whose PER is limited by spatial non-uniformity of their birefringence properties.

SUMMARY

In one embodiment of the invention, a method for improving polarization extinction ratio includes changing a polarization state of at least one light beam, wherein a portion of the light beam thereafter may have spatially non-uniform polarization states, and spatially filtering the light beam to reject part of the light beam with spatially non-uniform polarization states. Spatial filtering may be achieved by wavefront filtering (e.g. coupling the light beam into a polarization-maintaining single-mode fiber), or amplitude filtering (e.g. propagating the light beam through an aperture).

BRIEF DESCRIPTION OF THE DRAWINGS

FIGS. 6A, 6B, 6C, and 6D illustrate polarization control systems for maintaining the polarization states of two orthogonal linearly polarized light beams in embodiments of the invention.

DETAILED DESCRIPTION

Figure 9:
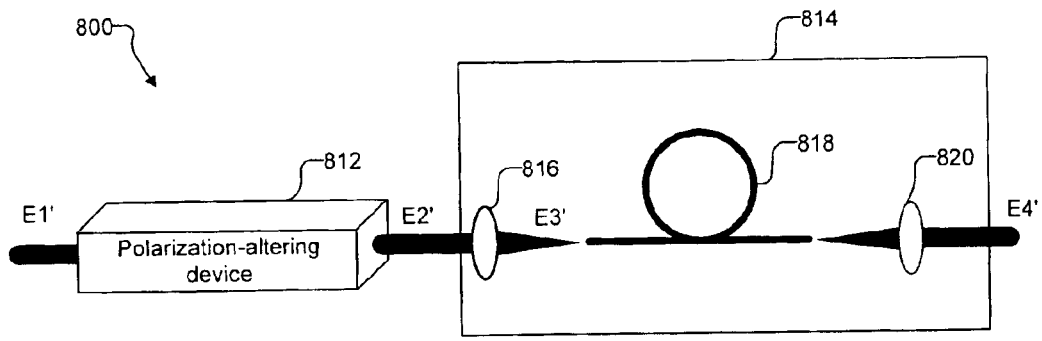
FIG. 9 illustrates a system for improving the polarization extinction ratio (PER) of a polarization-altering device in one embodiment of the invention.

FIG. 9 illustrates a system 800 for improving the polarization extinction ratio (PER) of a polarization-altering device in one embodiment of the invention. A polarization-altering device 812 receives an optical field E1' with a given polarization state. In one embodiment, polarization-altering device 812 is a polarization controller, a polarization state modulator, a polarization scrambler, a variable optical attenuator, or an optical switch. In one embodiment, polarization-altering device 812 includes a birefringent material used to alter the polarization state. The birefringent material can be a liquid crystal, an electro-optic crystal, or a photoelastic modulator. The birefringent material typically has spatially non-uniform birefringent properties. As a result, polarization-altering device 812 outputs an optical field E2' that acquires spatially non-uniform polarization states.

A spatial filter 814 receives optical field E2' and outputs an optical field E4' with improved polarization uniformity. In one embodiment, spatial filter 814 includes a lens 816 that receives optical field E2' and outputs a focused optical field E3' to a wavefront filter 818. Wavefront filter 818 rejects portions of the optical field with spatially non-uniform polarization states by filtering out non-flat wavefront distortions associated with the varying polarization states. Wavefront filter 818 outputs a light beam received by a lens 820. Lens 820 collimates the light beam and outputs optical field E4'.

Wavefront filter 818 improves the polarization extinction ratio (PER) of polarization-altering device 812 as follows. Upon exiting polarization-altering device 812, optical field E2' acquires spatially non-uniform polarization states due to spatial non-uniformity of the refractive indices of the material, which can be intrinsic or externally induced. At the same time and for the same reason, optical field E2' also acquires an associated distorted wavefront. The associated distorted wavefront has a shape that is dependent on the spatial variations of the refractive indices.

The key to PER improvement using wavefront filtering is the presence of wavefront distortions along with spatially non-uniform polarization states in the output beam after propagation through a birefringent material with spatially non-uniform birefringent properties. Since such wavefront distortions are spatially correlated with polarization variations, any wavefront filter 818 capable of filtering out non-flat wavefront distortions also filters out the associated polarization non-uniformity in the output light beam. After wavefront filtering, the optical field is left with only the portion with a flat wavefront and hence uniform polarization characteristics across the beam and an improved PER. Note that the PER improvement is limited by the PER of the PM fiber in this case (<−40 dB is possible), or by the PER of the spatial filter in general.

In one embodiment, wavefront filter 818 is a polarization-maintaining (PM) single-mode fiber. Since the fundamental mode of a PM single-mode fiber has a flat wavefront, only portions of the incoming optical field with a flat wavefront (and an intensity distribution which matches the intensity distribution of this mode) couple efficiently into this mode. These portions propagate through the fiber with minimum attenuation; other portions of the beam are highly attenuated (provided the fiber is reasonably long for the evanescent modes to die out). Calculations show that in one hypothetical case, a PM fiber improves the PER from −30 dB to <−90 dB with loss of <−0.01 dB assuming perfect coupling. In reality, the loss will be limited by fiber coupling loss and attenuation loss.

While a single-mode PM fiber performs both amplitude and wavefront filtering, wavefront filtering is responsible for most of the PER improvement in general. As will be discussed later, amplitude filtering may or may not help to improve PER. Since the orientation of polarization axes of a PM fiber changes with several factors such as temperature and mechanical stress, feedback control is usually required to obtain a stable output polarization state E4' (in addition to a good PER). This added complication to the overall system is a trade-off in exchange for a better PER. Several embodiments of feedback control system will be discussed later.

Instead of a PM single-mode fiber, wavefront filter 818 can be any device capable of filtering out non-flat wavefront distortions. The key is that the device has to filter out any higher-order (quadratic and higher) spatial frequency components in the wavefront (phase) of the optical field. A common way to achieve wavefront filtering is modal filtering, i.e. coupling into a waveguide mode which has a flat wavefront. A single-mode (PM or non-PM) fiber is one example of a waveguide. Other examples include planar waveguides and integrated optics waveguides. The waveguides should be designed for single-mode operation at the operating wavelength for optimal performance. In these two types of waveguides, orientation of the birefringent axes of the waveguide is determined by the fixed waveguide geometry. As a result, feedback control may not be required, depending on the requirements for polarization stability.

Figure 10:
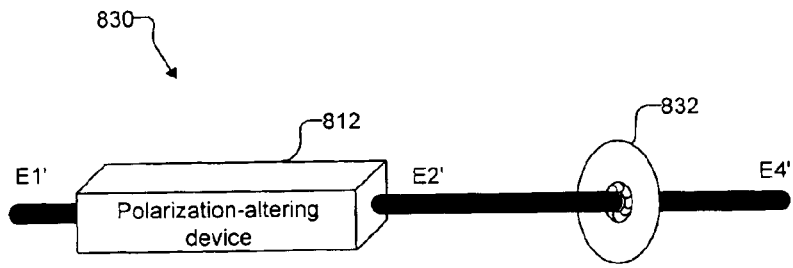
FIG. 10 illustrates a system for improving the polarization extinction ratio (PER) of a polarization-altering device in one embodiment of the invention.

FIG. 10 illustrates a system 830 for improving the polarization extinction ratio (PER) of a polarization-altering device in one embodiment of the invention. System 830 of FIG. 10 is similar to system 800 of FIG. 9 except that a spatial filter 832 has replaced spatial filter 814. In one embodiment, spatial filter 832 is an amplitude filter such as an aperture. Aperture 832 improves the polarization extinction ratio (PER) of polarization-altering device 812 as follows.

In FIG. 10, all wavefront (phase) distortions and the accompanying polarization variations still propagate through the aperture unfiltered. Hence none of the improvements discussed above regarding a wavefront filter applies in this case. Nevertheless, a simple aperture can provide limited PER improvements in specific cases through amplitude filtering. Take the example of an electro-optic crystal. Fringing fields due to application of voltage using finite electrodes are usually concentrated near the edges of the crystal. By spatially filtering the light coming out of the crystal with an aperture centered on the beam, the "tails" (i.e., light near the edges) are blocked. Thus, light at the tails with largest degree of polarization non-uniformity is filtered out.

An aperture may also filter out some of the polarization variations due to birefringence induced by mechanical stress, since stress tends to concentrate near the edges rather than at the center of the crystal.

It is obvious that a circular aperture is not optimal in that it provides limited PER improvement while introducing extra losses. In addition, beam clipping by an aperture can create diffraction rings in the beam profile. Calculations show that in one hypothetical case, a circular aperture improves the PER from −30 dB to −40 dB at the expense of additional ~−5.3 dB insertion loss when a lithium niobate crystal is used in the presence of fringing fields. In one optimal configuration, one should get <−0.01 dB of additional loss (if only the light with non-uniform polarization properties were filtered out).

Clearly, an aperture of a given size and shape does not always work well, and in fact, does not always work in general. In theory, an aperture which always provides optimal filtering is a mask which transmits only light with uniform polarization states and blocks out the rest of the light. Furthermore, the aperture mask should be dynamically reconfigurable if the mechanism causing polarization non-uniformity varies with time. Such an aperture may be complicated, costly, impractical, or difficult to manufacture. The most practical, realizable apertures are the ones with relatively simple geometries such as circular or square apertures. For reasons mentioned above, such apertures can provide limited PER improvements in specific cases at the expense of introducing extra insertion loss.

Figure 11:
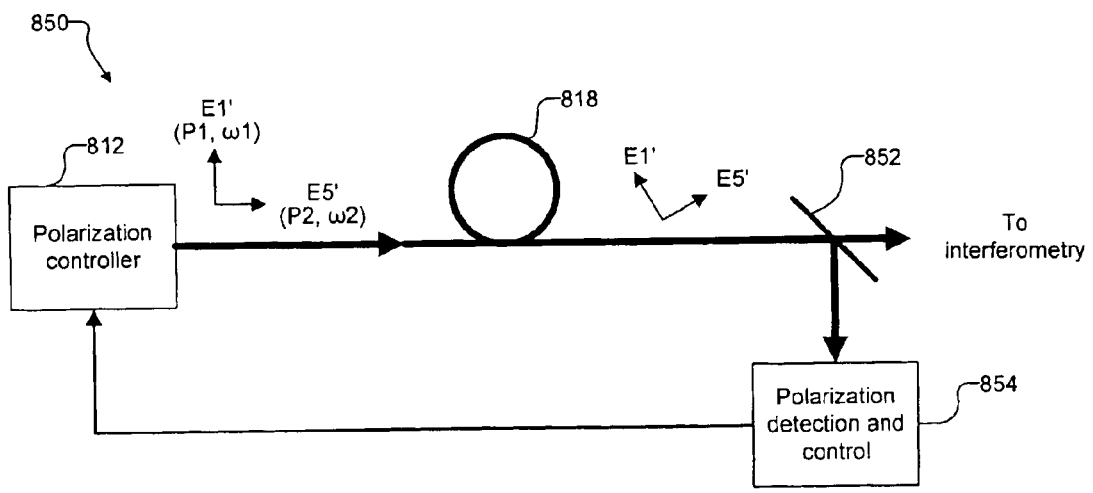
FIG. 11 illustrates an application of the invention to a heterodyne interferometer in which two orthogonal polarizations are used in one embodiment of the invention.

One specific application of this invention is its use in distance-measuring heterodyne interferometers, which require high PERs for both the test and reference beams in order to obtain accurate distance measurements. FIG. 11 illustrates one embodiment of a heterodyne interferometer system 850 in which two orthogonal polarizations E1' and E5' propagate through polarization-altering device 812, followed by a polarization-maintaining fiber 818 that delivers the light to the measurement site. As can be seen, a beam splitter 852 reflects part of the light to a polarization detection and feedback controller 854 that controls polarization-altering device 812.

Use of a PM fiber 818 is desirable since then the light source can be located far away from the measurement site so that temperature gradients from the light source do not affect the measurements. Use of a polarization-altering device 812 allows active control of the polarization states in order to obtain stable polarization states at the output of the fiber. At the same time, the combination of a polarization-altering device 812 and a PM fiber 818 provides an improved PER so that the PER of light at the output of the fiber is not limited by the PER of the polarization-altering device; instead, the PER will be limited by that of the PM fiber. Embodiments of active control of two orthogonal polarizations in a heterodyne interferometer system are described later in reference to FIGS. 1 to 8.

Prior to describing the embodiments of active control of two orthogonal polarizations in a heterodyne interferometer system in detail, a few key terms are hereafter defined. A retarder (or wave plate) is an optical device that resolves a light wave into two orthogonal polarization components and produces a phase shift (defined as retardance) between them. The resulting light wave is generally of a different polarization form. All angle orientations of retarders in this document refer to orientation of the slow axis relative to the horizontal axis (x-axis). A variable retarder is a retarder whose retardance can be changed by external means, e.g., by the application of a voltage.

A polarization state modulator (PSM) is a device which converts the input polarization state into an output polarization state. The output polarization state is controlled by one or more external inputs applied to the PSM, e.g., voltage. The output polarization state is different from the input polarization state in general. For example, the PSM can consist of multiple variable retarders.

Figure 1:
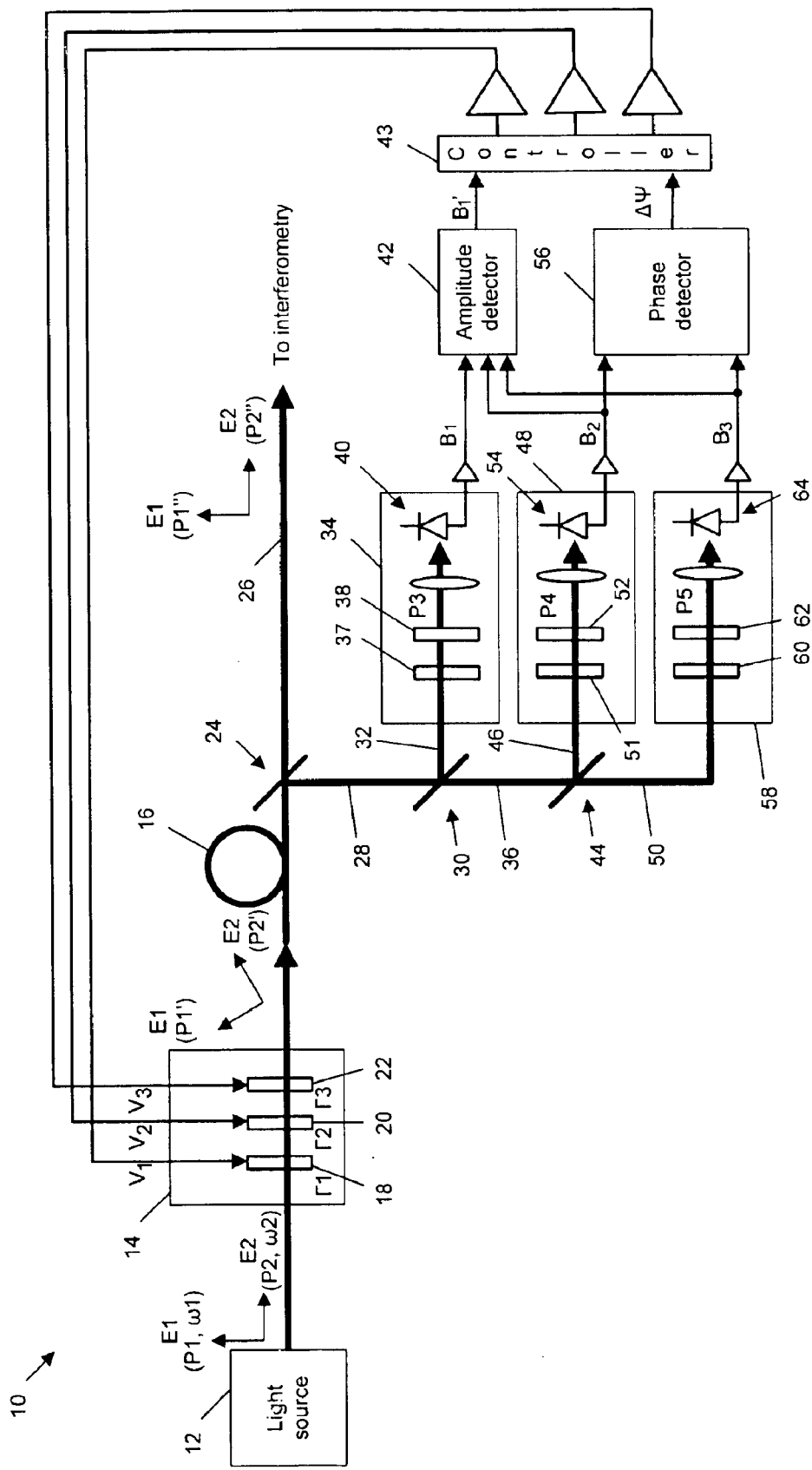
FIG. 1 illustrates a polarization control system for maintaining any polarized states of two orthogonally polarized light beams in one embodiment of the invention.

FIG. 1 illustrates a polarization control system 10 in one embodiment of the invention. System 10 is implemented in a remote operation configuration where the polarization state modulator is located upstream from a fiber that feeds an interferometry system for measuring displacement.

A light source 12 generates (1) a light beam E1 with a polarization state P1 and a frequency $\omega 1$, and (2) a light E2 with a polarization state P2 and a frequency $\omega 2$. In one embodiment, light source 12 includes a Helium Neon (HeNe) laser and electro-optical components required to generate the desired polarizations and frequencies. For example, light source 12 is a 5517D laser made by Agilent Technologies. A voltage-controlled polarization state modulator (PSM) 14 receives light beams E1 and E2 and adjusts their polarization states to P1' and P2', respectively, before launching them into a fiber 16. Voltage-controlled PSM 14 is operable to change any input polarization state to any desired output polarization state. In one embodiment, voltage-controlled PSM 14 includes a voltage-controlled variable retarder 18 oriented at 0°, a voltage-controlled variable retarder 20 oriented at 45°, and a voltage-controlled variable retarder 22 oriented at 0°. Retarders 18, 20, and 22 are controlled by voltages V1, V2, and V3 to generate retardances $\Gamma 1$, $\Gamma 2$, and $\Gamma 3$, respectively.

Fiber 16 carries light beams E1 and E2 downstream to a measurement site. In one embodiment, fiber 16 is a polarization-maintaining (PM) fiber. Experiments show that fiber 16 changes the polarization states of light beams E1 and E2 to P1" and P2", respectively, due to temperature variation, mechanical deformation of the fiber, and mechanical vibration. Nonetheless, fiber 16 produces negligible change to the orthogonal relationship between the polarization states of light beams E1 and E2.

At the measurement site, a beam splitter 24 divides light beams E1 and E2 into two paths. An output path 26 carries light beams E1 and E2 to the distance-measuring interferometry (hereafter "DMI") system. A monitor path 28 carries light beams E1 and E2 to components that monitor and maintain the polarization states of E1 and E2 described hereafter. Some or all of these components can be located either at the measurement site or away from the measurement site. For example, light exiting components 38, 52, and 62 can be each coupled to a multimode fiber in conjunction with a focusing lens leading to the detector components away from the measurement site.

A beam splitter 30 receives light beams E1 and E2 from path 28 and divides them into two paths. A path 32 carries light beams E1 and E2 to a first detector path 34, and a path 36 carries light beams E1 and E2 to other detector paths. First detector path 34 includes a polarizer 38 that allows the components of light beams E1 and E2 at a selected polarization state P3 to reach a light detector 40. A focusing lens may be interposed between polarizer 38 and light detector 40 to focus the light. In response to the light intensity received, light detector 40 transmits a beat signal B1 at a beat tone frequency of ($\omega 1 - \omega 2$) to an amplitude-sensing device 42. Beat signal B1 represent the optical power detected. An amplifier may be interposed between light detector 40 and amplitude-sensing device 42 to amplify the beat signal B1. Before polarizer 38, first detector path 34 can optionally include one or more wave plates 37. Wave plates 37 and polarizer 38 are selected according to the desired orientation of the output polarization states of light beams E1 and E2.

A beam splitter 44 receives light beams E1 and E2 from path 36 and divides them into two paths. A path 46 carries light beams E1 and E2 to a second detector path 48, and a path 50 carries light beams E1 and E2 to another detector path. Second detector path 48 includes a polarizer 52 that allows the components of light beams E1 and E2 at a selected polarization state P4 to reach a light detector 54. A focusing lens may be interposed between polarizer 52 and light detector 54. In response to the light intensity received, light detector 54 transmits a beat signal B2 to a phase detector 56. An amplifier may be interposed between light detector 54 and phase detector 56. Before polarizer 52, second detector path 48 optionally includes one or more wave plates 51. Wave plates 51 and polarizer 52 are selected to generate a large beat signal B2 depending on the desired orientation of the output polarizations states of light beams E1 and E2.

Path 50 carries light beams E1 and E2 to a third detector path 58. Third detector path 58 includes a polarizer 62 that allows the components of light beams E1 and E2 at a selected polarization state P5 to reach a light detector 64. A focusing lens may be interposed between polarizer 62 and light detector 64. In response to the light intensity received, light detector 64 transmits a beat signal B3 to phase detector 56. An amplifier may be interposed between light detector 64 and phase detector 56. Before polarizer 62, the third detector path 58 optionally includes one or more wave plates 60. Wave plates 60 and polarizer 62 are selected to generate a beat signal B3 that has a different phase relationship with beat signal B2 for each of the two possible solutions of E1 and E2 corresponding to a minimum amplitude detected by amplitude-sensing device 42 in first detector path 34. In one embodiment, the phase relationship is 90° out of phase (i.e., beat signals B2 and B3 are in quadrature).

Phase detector 56 determines a phase difference $\Delta\Psi$ between beat signals B2 and B3. Amplitude-sensing device 42 determines an amplitude B1' of beat signal B1 at the beat tone frequency (i.e., $\omega 1 - \omega 2$). A controller 43 uses amplitude B1' and phase difference $\Delta\Psi$ to generate control voltages which are applied to PSM 14 in order to achieve the desired polarization states of light beams E1 and E2 as they exit fiber 16. Amplifiers may be interposed between controller 43 and PSM 14 to amplify the control signals. Controller 43 can be implemented using analog and digital components.

Specifically, controller 43 adjusts PSM 14 until beat tone amplitude B1' reaches one of two local minimums. If all the orthogonal polarization states of E1 and E2 were applied to the system, it would be found that tone amplitude B1' has two local minimums because the beat tone function has two degenerate solutions that correspond to two possible orientations of E1 and E2. Controller 43 uses phase difference $\Delta\Psi$ to uniquely determine the polarization states of E1 and E2 because the phase difference $\Delta\Psi$ has different values at the two minimums that correspond to the two orientations of E1 and E2. The exact correspondence between the values of phase difference $\Delta\Psi$ and the orientations of E1 and E2 can be derived conventionally using Jones calculus. For example, see "Polarization of Light" by Serge Huard, published by John Wiley & Sons, 1997.

Figure 2:
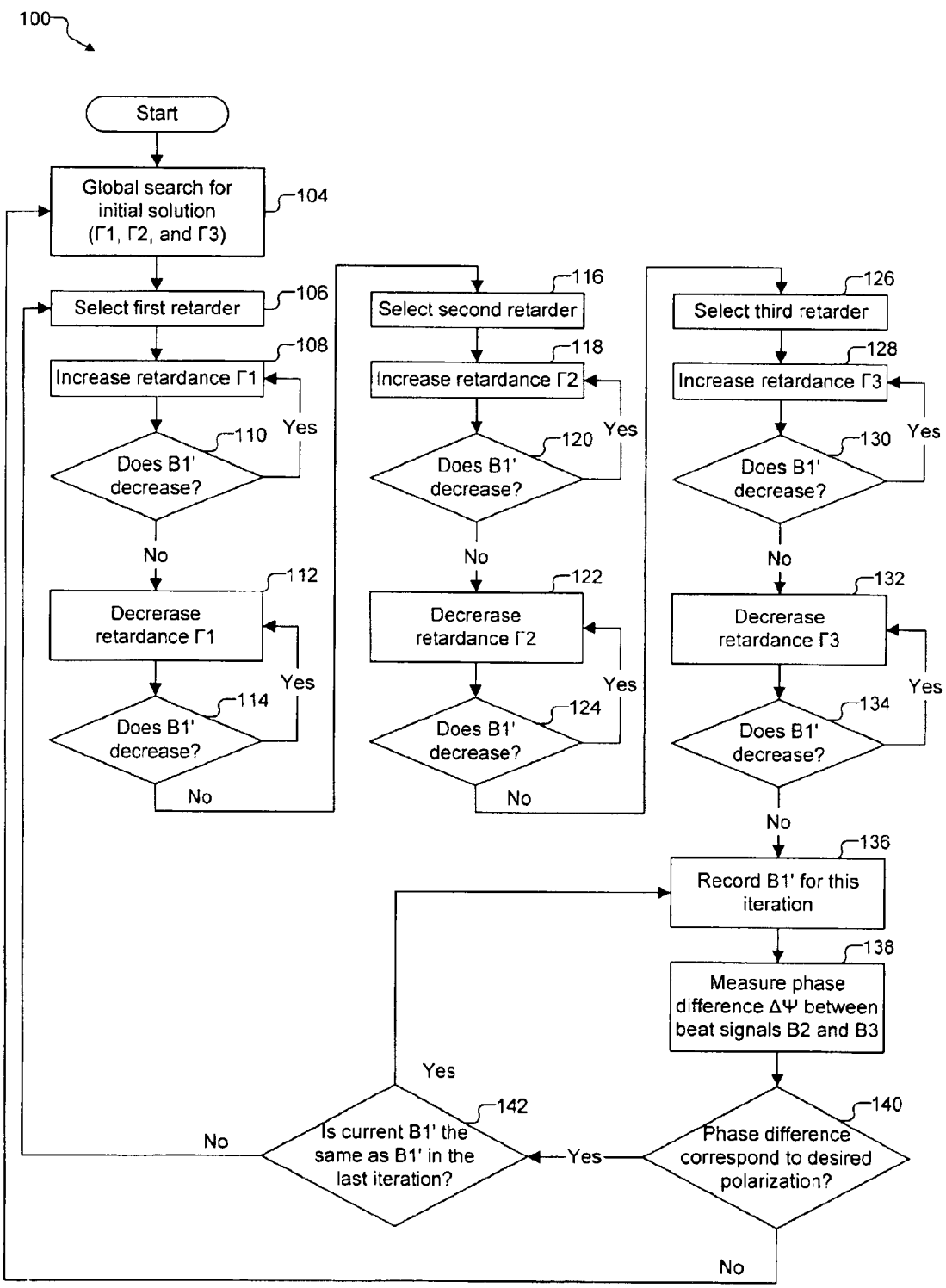
FIGS. 2 and 3 are flowcharts of methods for operating the polarization control system of FIG. 1 in one embodiment of the invention.

FIG. 2 illustrates a method 100 for using system 10 to lock into a desired polarization orientation in one embodiment. In a step 104, controller 43 performs a global search for an initial solution of retardances $\Gamma 1$, $\Gamma 2$, and $\Gamma 3$ that would produce a local minimum with the correct polarization orientation. The values of $\Gamma 1$, $\Gamma 2$, and $\Gamma 3$ in the initial solution are used as the initial retardance values. One embodiment of step 104 is described later in reference to FIG. 3.

In steps 106 to 114, controller 43 adjusts retardance $\Gamma 1$ of retarder 18 to find the minimum value of beat tone amplitude B1' that can be achieved with retardance $\Gamma 1$. Specifically, in step 106, controller 43 selects retarder 18. In step 108, controller 43 increments retardance $\Gamma 1$ by adjusting voltage V1. In step 110, controller 43 determines if beat tone amplitude B1' has decreased. If so, step 110 is followed by step 108. Otherwise step 110 is followed by step 112.

In step 112, controller 43 decrements retardance $\Gamma 1$ by adjusting voltage V1. In step 114, controller 43 determines if beat tone amplitude B1' has decreased. If so, step 114 is followed by step 112. Otherwise step 114 is followed by step 116.

In steps 116 to 124, controller 43 adjusts retardance $\Gamma 2$ of retarder 20 to find the minimum value of beat tone amplitude B1' that can be achieved with retardance $\Gamma 2$. Step 124 is followed by step 126 once the minimum value of beat tone amplitude B1' has been achieved. In steps 126 to 134, controller 43 adjusts retardance $\Gamma 3$ of retarder 22 to find the minimum value of beat tone amplitude B1' that can be achieved with retardance $\Gamma 3$. Step 134 is followed by step 136 once the minimum value of beat tone amplitude B1' has been achieved.

In step 136, controller 43 records the value of beat tone amplitude B1' for the current iteration. In step 138, controller 43 determines phase difference $\Delta\Psi$ between beat signals B2 and B3. In step 140, controller 43 determines if the value of phase difference $\Delta\Psi$ corresponds to the desired output polarization states of E1 and E2. Phase difference $\Delta\Psi$ may not correspond to the desired output polarization states if there is a large and sudden change in the condition of fiber 16 that cause a large and sudden change in the polarization states of E1 and E2, which may cause the control loop to lose lock momentarily, and hence the system may not be locked to the same initial solution thereafter. If so, then step 140 is followed by step 104 where method 100 is repeated to search for another initial solution of retardances $\Gamma 1$, $\Gamma 2$, and $\Gamma 3$. If phase difference $\Delta\Psi$ corresponds to the desired output polarization states of E1 and E2, then step 140 is followed by step 142.

In step 142, controller 43 determines if the current beat tone amplitude B1' is the same as the beat tone amplitude B1' recorded from the previous iteration. If so, then step 142 is followed by 136 and method 100 loops until the beat tone amplitude B1' changes value. If the current beat tone amplitude B1' is not the same as the beat tone amplitude B1' recorded from the previous iteration, then step 142 is followed by step 106 and method 100 is repeated to search for another minimum beat tone amplitude B1'.

Figure 3:
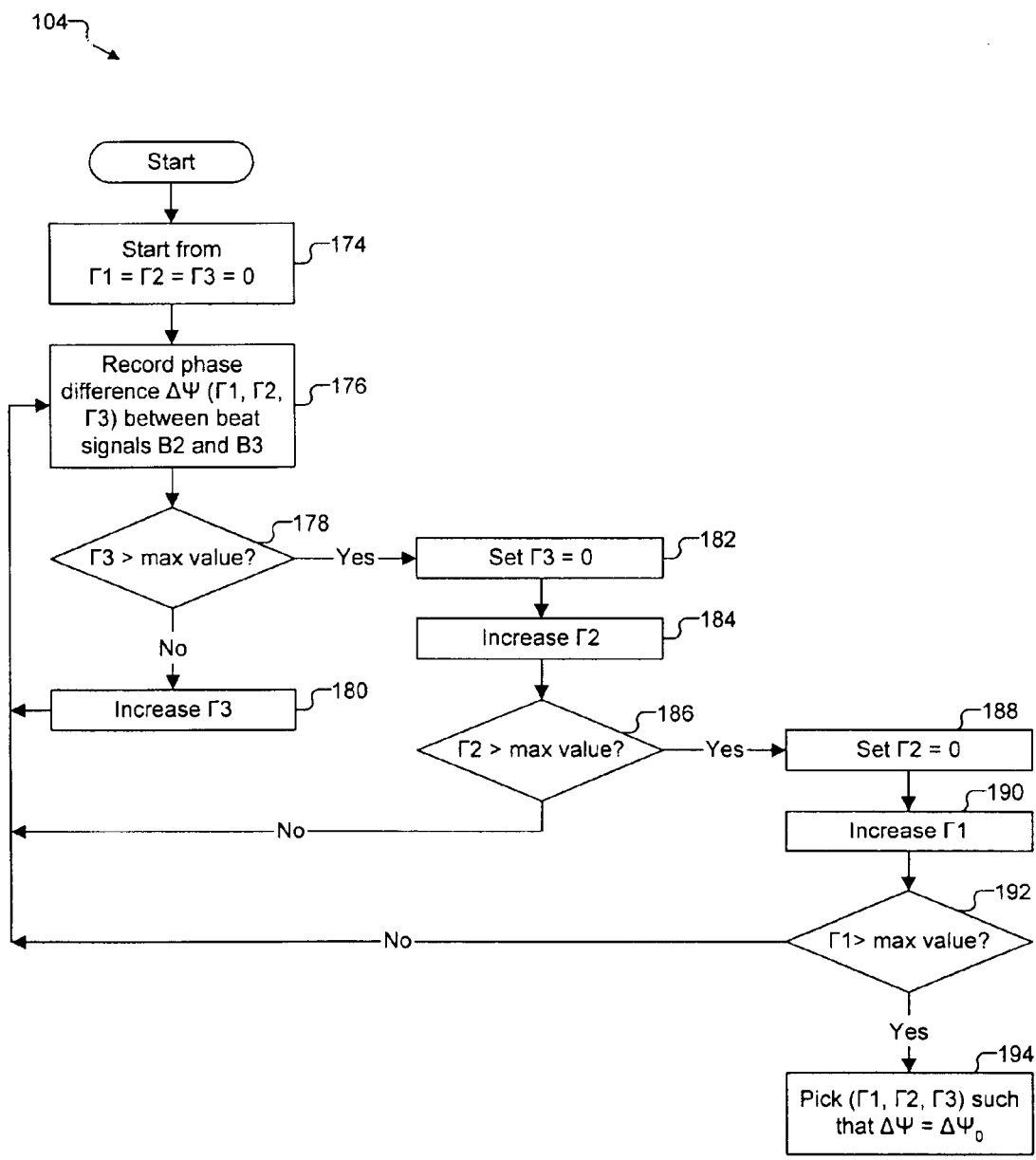

FIG. 3 illustrates one embodiment of step 104 where controller 43 searches through some or all of the polarization states of E1 and E2 for an initial solution of retardances $\Gamma 1$, $\Gamma 2$, and $\Gamma 3$ that produces the desired orientation of the polarization states of E1 and E2. In step 174, controller 43 initializes retardances $\Gamma 1$, $\Gamma 2$, and $\Gamma 3$ to 0. Minimum values of zero retardance are assumed here, but the search can start from any minimum value of retardances $\Gamma 1$, $\Gamma 2$, and $\Gamma 3$ achievable by the retarders or desired to be searched. In step 176, controller 43 records phase difference $\Delta\Psi$ between beat signals B2 and B3 generated with the current values of retardances $\Gamma 1$, $\Gamma 2$, and $\Gamma 3$. In step 178, controller 43 determines if retardance $\Gamma 3$ exceeds its maximum value. The maximum value may be the maximum retardance that a retarder can achieve or desired to be searched. If retardance $\Gamma 3$ exceeds its maximum value, then step 178 is followed by step 182. If retardance $\Gamma 3$ has not exceeded its maximum value, then step 178 is followed by step 180. In step 180, controller 43 increments retardance $\Gamma 3$ by adjusting voltage V3. Step 180 is followed by step 176 and the above steps loop until retardance $\Gamma 3$ exceeds its maximum value.

In step 182, controller 43 reinitializes $\Gamma 3$ to 0. In step 184, controller 43 increments retardance $\Gamma 2$ by adjusting voltage V2. In step 186, controller 43 determines if retardance $\Gamma 2$ exceeds its maximum value. If so, then step 186 is followed by step 188. If retardance Γ2 has not exceeded its maximum value, then step 186 is followed by step 176 and the above steps loop until both retardances Γ3 and Γ2 exceed their maximum values.

In step 188, controller 43 reinitializes Γ2 to 0. In step 190, controller 43 increments retardance Γ1 by adjusting voltage V1. In step 192, controller 43 determines if retardance Γ1 exceeds its maximum value. If so, then step 192 is followed by step 194. If retardance Γ1 has not exceeded its maximum value, then step 192 is followed by step 176 and the above steps loop until retardances Γ3, Γ2, and Γ1 exceed their maximum values. In step 194, controller 43 selects the values of retardances Γ3, Γ2, and Γ1 that produced a desired phase difference $\Delta\Psi_0$, which corresponds to the desired output polarization states of E1 and E2, as the initial solution for method 100.

Figure 4:
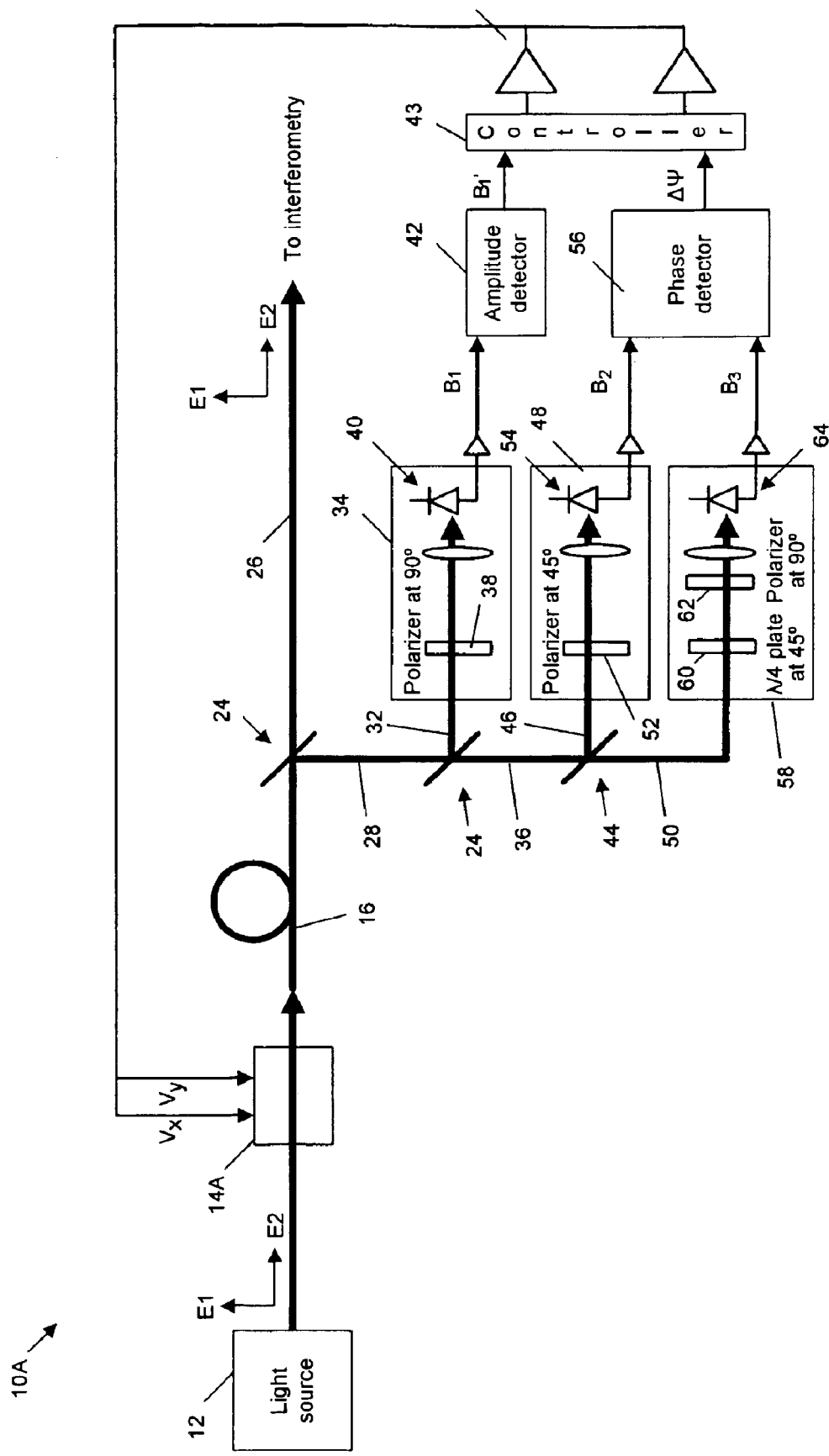
FIG. 4 illustrates a polarization control system for maintaining the polarization states of two orthogonal linearly polarized light beams in one embodiment of the invention.

FIG. 4 illustrates one implementation of system 10 in FIG. 1, hereafter system 10A, which is applicable to a specific orientation of the polarization states in one embodiment of the invention. In system 10A, light source 12 generates a vertically linearly polarized (VLP) E1 and a horizontally linearly polarized (HLP) E2. In system 10A, it is desired to maintain the polarization states of E1 and E2 at the output of fiber 16. Thus, polarizer 38 is oriented at 90°, polarizer 52 is oriented at 45°, wave plate 60 is selected to be a quarter-wave plate oriented at 45°, and polarizer 62 is oriented at 90°.

Figure 5:
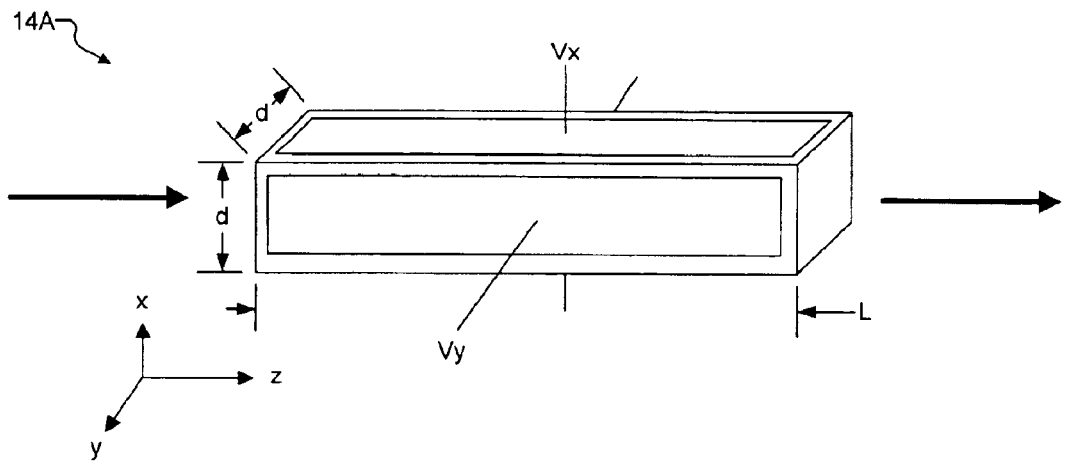
FIG. 5 illustrates a polarization state modulator in the polarization control system of FIG. 4.

FIG. 5 illustrates one embodiment of a PSM 14A used to adjust the polarization states of E1 and E2 in system 10A (FIG. 4). PSM 14A is a rotatable variable retarder made of an electro-optic crystal, such as lithium niobate crystal (LiNbO$_3$), with light propagation in the z-direction and voltages applied in the x and y-directions. The polarization axes and retardance of the LiNbO3 are controlled by changing voltages $V_x$ and $V_y$ so that any input polarization state can be transformed into any output polarization state if both $V_x$ and $V_y$ operate over a range $[-V_\pi, V_\pi]$, where the half-wave voltage $V_\pi=\lambda d/(2n_0^3 r_{22} L)$, $\lambda$ is the wavelength of the light beam, d is the width and height of the LiNbO$_3$, $n_0$ is the ordinary index of the LiNbO$_3$, L is the length of the crystal, and $r_{22}$ is the electro-optical coefficient of the LiNbO$_3$.

In one embodiment, system 10A can use a method similar to method 100 (FIGS. 2 and 3) to maintain the desired polarization states of E1 and E2. Controller 43 first performs a global search to find initial values of voltages $V_x$ and $V_y$ that produce a desired phase difference $\Delta\Psi_0$. Controller 43 then performs a minimum search continuously to lock onto the minimum corresponding to the desired phase difference $\Delta\Psi_0$.

When a PM fiber is used in the systems described above, E1 and E2 typically undergo a small polarization change (e.g., less than 20% power change through the polarizer). Thus, there may not be a need for a PSM that can generate all the possible input polarization states in order to find and lock to the desired output polarization states. In fact, a proper design can reduce the range of polarization states that needs to be searched, thereby allowing the elimination of some variable retarders and possibly the quadrature detection. For example, only polarization states covering half of the Poincare sphere (a mathematical construction which describes all polarization states) may need to be searched.

Figure 6A:
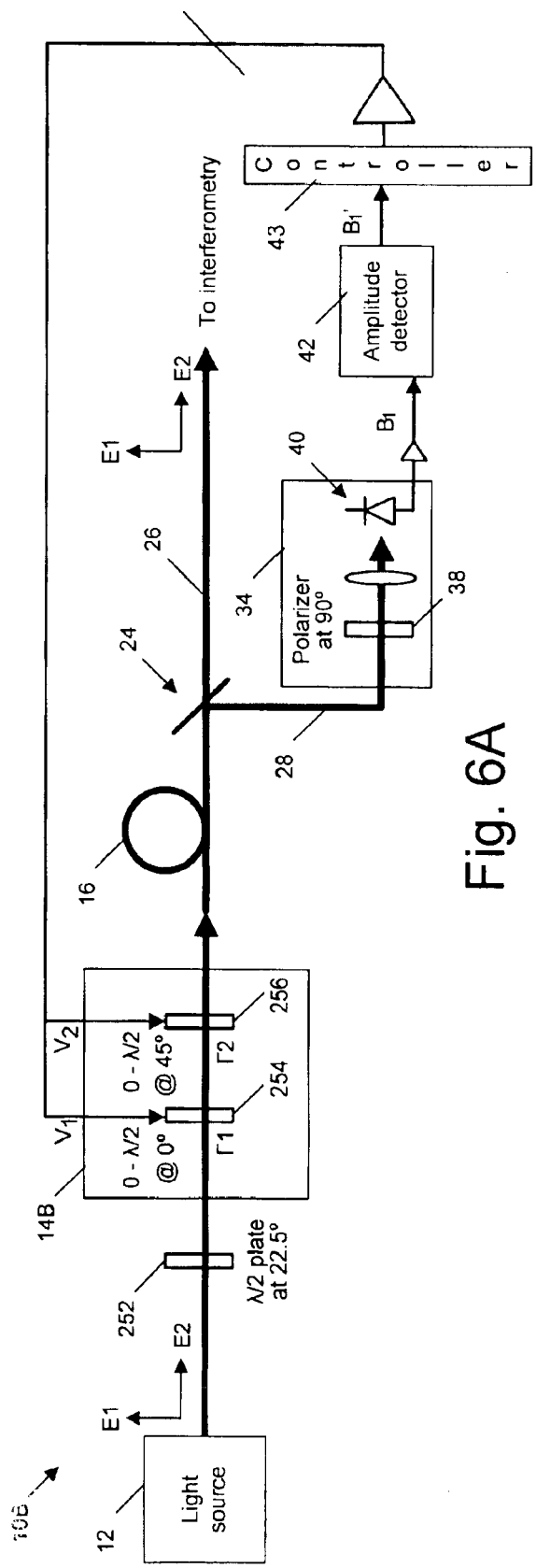

FIG. 6A illustrates one implementation of system 10 in FIG. 1, hereafter system 10B, which is applicable to small changes in the polarization states in one embodiment of the invention. In system 10B, light source 12 generates a VLP E1 and a HLP E2. In system 10B, it is desired to maintain the polarization states of E1 and E2 at the output of fiber 16.

A retarder 252 and a PSM 14B are used to produce a subset of the possible polarization states of E1 and E2. Retarder 252 is a half-wave plate oriented at 22.5°. PSM 14B includes (1) a variable retarder 254 oriented at 0° and having a variable retardance that ranges from 0 to $\lambda/2$, and (2) a variable retarder 256 oriented at 45° and having a variable retardance that ranges from 0 to $\lambda/2$. Retarder 252 and PSM 14B allow approximately half of the Poincare sphere to be searched so system 10B will lock onto only one of the two minimums of beat tone amplitude B1', since the other solution is excluded by design. Furthermore, retarder 252 and PSM 14B allow polarization states to be scanned continuously without any breaks within the region of interest (e.g., half the Poincare sphere) that would otherwise require one or more additional variable retarders to provide endless (i.e., reset-free) polarization control.

System 10B includes only one detector path, i.e., the first detector path 34 that generates beat signal B1. Controller 43 uses only beat signal B1 to lock onto the only minimum within the input polarization states that can be produced by PSM 14B. No global search for an initial solution is needed as only one minimum is accessible within the input polarization states that can be produced by retarder plate 252 and PSM 14B.

Figure 6B:
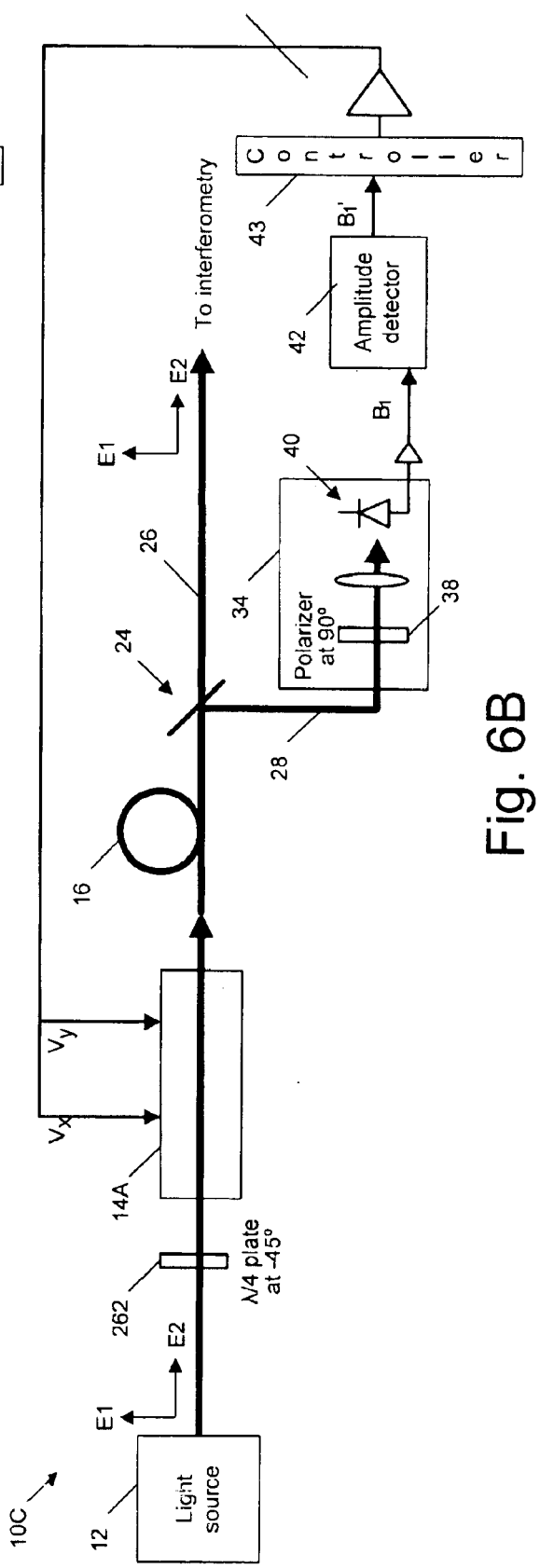

FIG. 6B illustrates a system 10C similar to system 10B except for a different retarder and a different PSM in one embodiment of the invention. System 10C includes a quarter-wave plate 262 oriented at −45° and PSM 14A (FIG. 5). As described above, PSM 14A is a rotatable variable retarder controlled by voltages $V_x$ and $V_y$, wherein voltage $V_x$ operates over a range $[0, V_\pi]$ and voltage $V_y$ operates over a range $[-V_\pi, V_\pi]$. Retarder 262 and PSM 14A allow approximately half of the Poincare sphere to be searched continuously without any breaks in the polarization states that would otherwise require one or more additional rotatable variable retarders to provide endless polarization control.

While the desired polarization states for heterodyne interferometry typically correspond to a VLP E1 and HLP E2, it is possible to design a system that locks E1 and E2 to polarization states other than VLP and HLP while still obtaining VLP and HLP states before E1 and E2 enter the interferometer. FIG. 6C illustrates such a system 10D in one embodiment of the invention. System 10D is similar to systems 10B and 10C except for modifications described below. The input polarization states are a VLP E1 and a HLP E2. Retarder 252 (FIG. 6A) and retarder 262 (FIG. 6B) are not used in system 10D. PSM 14D includes (1) a variable retarder 254D oriented at 45° and operating over a retardance range of 0 to $\lambda/2$, and (2) a variable retarder 256D oriented at 0° and operating over a retardance range of $\lambda/2$ to $3\lambda/2$. A quarter-wave plate 600 oriented at 45° is included in detector path 34 before polarizer 38 so that the minimum beat amplitude corresponds to a left circular polarization (LCP) state E1 and a right circular polarization (RCP) state E2. A second quarter-wave plate 602 oriented at 45° is included in path 26 to convert the LCP E1 and RCP E2 to a VLP E1 and a HLP E2 before they enter the interferometer.

FIG. 6D illustrates a system 10E, which combines the features of system 10B and system 10D, in one embodiment of the invention. In system 10E, light source 12 generates a E1 and a E2 with polarization states depending on the application. Similar to system 10B, a retarder 252E and a PSM 14E are used to produce a subset of the possible polarization states of E1 and E2. The retardance and orientation of retarder 252E depend on the input polarization states and the desired output polarization states of E1 and E2. Similar to system 10D, a retarder 600E is included in detector path 34 before polarizer 38 so that the minimum beat amplitude corresponds to the desired polarization states of E1 and E2. A retarder 602E is included in path 26 to convert E1 and E2 to the desired polarization states before they enter the interferometer. Again, the retardance and the orientation of retarder 602E depend on the desired polarization states of E1 and E2.

Figure 7:
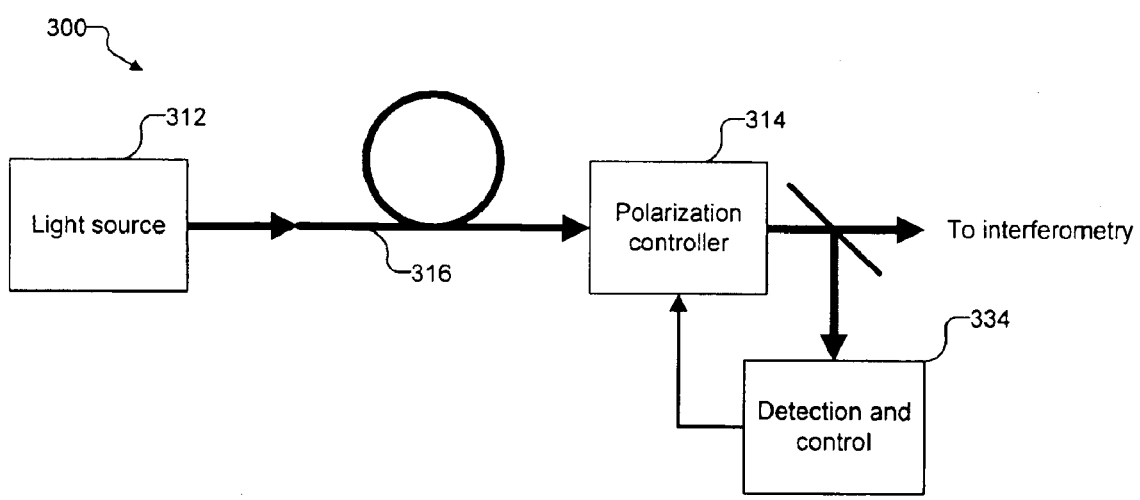
FIG. 7 illustrates a non-remote configuration of a polarization control system in one embodiment of the invention.

The various embodiments of the polarization control system described above have all been shown in a remote operation configuration, where the PSM is located upstream from the fiber and the measurement site. FIG. 7 illustrates one embodiment of a non-remote polarization control system 300 where a PSM 314 is located downstream from a fiber 316 at the measurement site. As can be seen, a light source 312 launches two light beams with orthogonal polarization states and different frequencies into fiber 316. Fiber 316 then carries the two light beams to PSM 314. PSM 314 adjusts the polarization states of the two light beams before sending them to an output path and a monitor path. PSM 314 can be implemented as described above in FIGS. 1, 4, 5, 6A and 6B. The output path leads to an interferometry system for measuring displacement. The monitor path leads to a detection and control block 334 that generates the feedback control to PSM 314 to maintain the desired output polarization states of the two light beams. Block 334 can be implemented as described in FIGS. 1, 4, 6A, and 6B.

Figure 8:
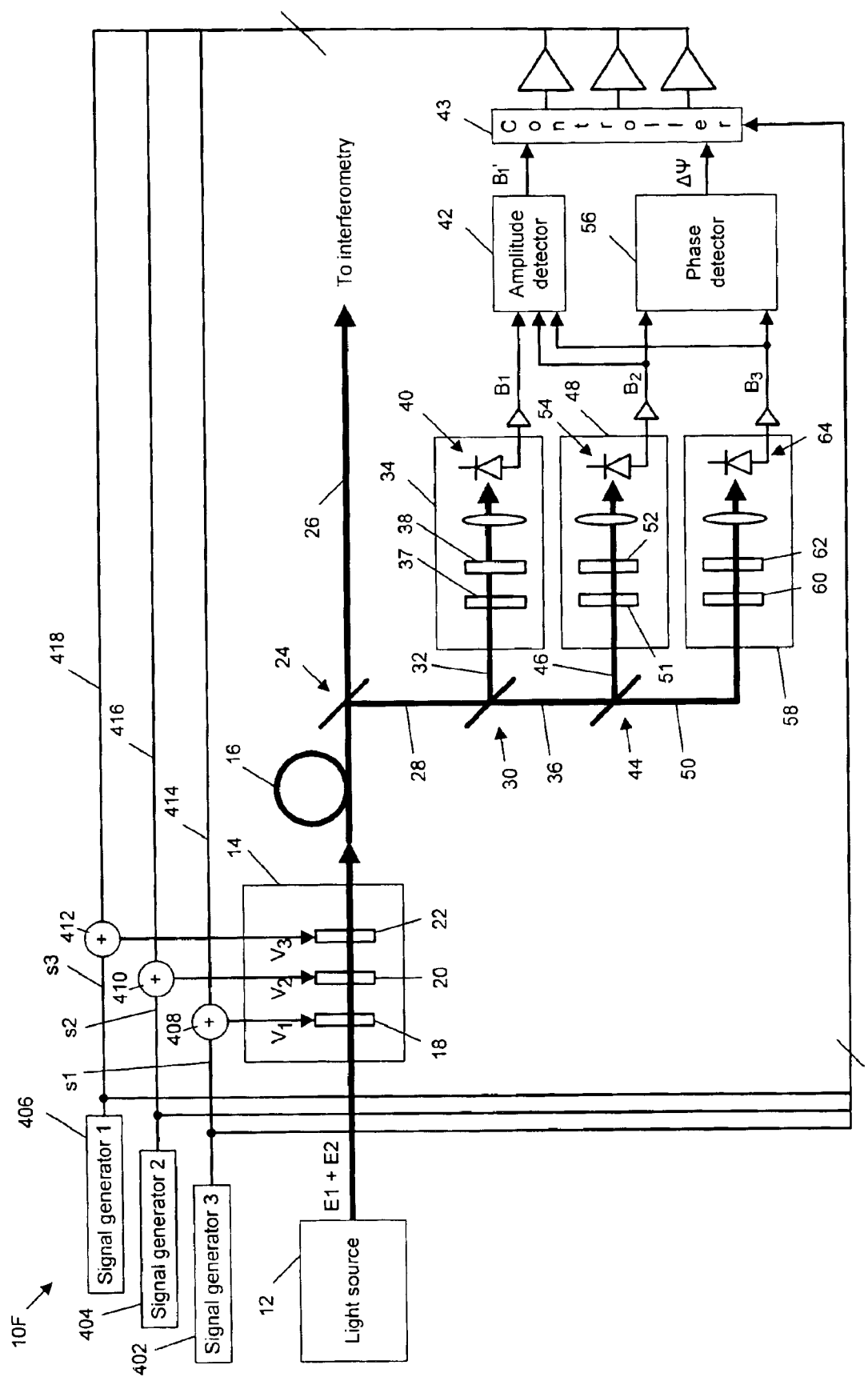
FIG. 8 illustrates a polarization control system using dithering to maintain any polarized states of two orthogonally polarized light beams in one embodiment of the invention.

FIG. 8 illustrates one implementation of system 10 in FIG. 1, hereafter system 10F, which locks onto the desired beat tone amplitude B1' using dithering. The technique of dithering generates small modulation terms to each control signal in order to aid the detection of the derivative of the detected signal (including sign). This technique also filters out changes in amplitude detected by amplitude-sensing device 42 due to other factors such as mechanical vibration and temperature variation. System 10F is similar to system 10 except with the addition of signal generators 402, 404, and 406, and adders 408, 410, and 412. Signal generators 402, 404, and 406 generate small orthogonal modulation signals s1, s2, s3 (which could be sinusoidal at frequencies f1, f2, and f3). Controller 43 detects signals s1, s2, s3 and generates three signals 414, 416, and 418 using correlation techniques, which are added to corresponding control dither signals s1, s2, and s3 to generate control signals V1, V2, and V3 to variable retarders 18, 20, and 22, respectively.

Note that the desired output polarization states do not need to be the same as the input polarization states emerging from the light source. For example, one embodiment of system 10B in FIG. 6A can be used for input polarization states corresponding to a left circularly polarized E1 and a right circularly polarized E2 from the laser, and for generating desired output polarization states corresponding to a VLP E1 and a HLP E2. In such an embodiment, retarder 252 would be a quarter-wave plate oriented at 90°. Similarly, one embodiment of system 10C in FIG. 6B can be used for input polarization states corresponding to a left circularly polarized E1 and a right circularly polarized E2 from the laser, and for generating desired output polarization states corresponding to a VLP E1 and a HLP E2. In such an embodiment, retarder 262 would not be needed.

Although various embodiments of the PSM have been described above, additional embodiments of the PSM can be used. One embodiment of the PSM includes two or more fiber squeezers whose birefringence properties are varied by the application of mechanical stresses. Mechanical stresses are applied to the fiber squeezers in response to the control signals from controller 43. Another embodiment of PSM includes two or more liquid crystal cells whose retardances and/or polarization axes are varied in response to the control signals from controller 43. Yet another embodiment of PSM includes two or more mechanically rotatable wave plates with fixed retardance. The wave plates are rotated in response to the control signals from controller 43. Yet another embodiment of the PSM includes two or more photoelastic modulators whose linear birefringences are induced by the application of mechanical stresses. Mechanical stresses are applied to these photoelastic modulators in response to the control signals form controller 43.

In some applications, particularly heterodyne interoferfmetry, it is often desired that the test and reference beams have orthogonal polarizations. However, the polarizations of the two light beams emerging from the light source may have spatially non-uniform polarization states and hence may not be perfectly orthogonal. In such case, wavefront filtering also helps to improve the orthogonality of the polarizations of the two light beams. This is a direct consequence of the fact that the PER of each of the light beam is improved after wavefront filtering.

Various other adaptations and combinations of features of the embodiments disclosed are within the scope of the invention. Embodiments of the invention described above are not limited to any particular kind of material or technology used to realize polarization-altering device 812. Embodiments of the invention described above are also not limited to any particular kind of material or technology used to realize the spatial filter. Instead, embodiments of the invention are effective whenever the PER is limited by spatially non-uniform polarization states and the limited PER is improved by spatial filtering of the wavefront or amplitude of the light or both. For example, embodiments of the invention can improve PER of a polarization-altering device that generates spatially non-uniform polarization states that are not caused by the birefringent properties of the polarization-altering device. Numerous embodiments are encompassed by the following claims.

What is claimed is:

1. A method for improving polarization extinction ratio, comprising:

changing a polarization state of at least one light beam, wherein a portion of the light beam comprises spatially non-uniform polarization states;

spatial filtering the light beam to filter out the portion of the light beam with the spatially non-uniform polarization states;

wherein said spatial filtering the light beam comprises filtering at least one of a wavefront of the light beam and an amplitude of the light beam, and said filtering a wavefront of the light beam comprises passing the light beam through a spatial filter selected from the group consisting of a polarization-maintaining single-mode fiber, a single-mode fiber, a planar waveguide, and an integrated optics waveguide.

2. The method of 1, wherein said filtering an amplitude of the light beam comprises passing the light beam through an aperture.

3. The method of claim 1, wherein said changing a polarization state of at least one light beam comprises passing the light beam through a birefringent material.

4. The method of claim 3, wherein the birefringent material is selected from the group consisting of a liquid crystal, an electro-optic crystal, and a photoelastic modulator.

5. The method of claim 1, wherein said changing a polarization state of at least one light beam comprises passing the light beam through a polarization-altering device selected from the group consisting of a polarization controller, a polarization state modulator, a polarization scrambler, a variable optical attenuator, and an optical switch.

6. The method of claim 1, wherein the spatially non-uniform polarization states are caused by spatially non-uniform birefringent properties.

7. A method for improving polarization extinction ratio, comprising:

changing a polarization state of at least one light beam, wherein a portion of the light beam comprises spatially non-uniform polarization states;

spatial filtering the light beam to filter out the portion of the light beam with the spatially non-uniform polarization states; and transmitting the light beam and another nominally orthogonally polarized light beam to a heterodyne interferometer.

8. The method of claim 7, wherein said spatial filtering the light beam comprises filtering at least one of a wavefront of the light beam and an amplitude of the light beam.

9. The method of claim 8, wherein said filtering a wavefront of the light beam comprises passing the light beam through a spatial filter selected from the group consisting of a polarization-maintaining single-mode fiber, a single-mode fiber, a planar waveguide, and an integrated optics waveguide.

10. The method of claim 8, wherein said filtering an amplitude of the light beam comprises passing the light beam through an aperture.

11. The method of claim 7, wherein said changing a polarization state of a light beam comprises passing the light beam through a birefringent material.

12. The method of claim 11, wherein the birefringent material is selected from the group consisting of a liquid crystal, an electro-optic crystal, and a photoelastic modulator.

13. The method of claim 7, wherein said changing a polarization state of a light beam comprises passing the light beam through a polarization-altering device selected from the group consisting of a polarization controller, a polarization state modulator, a polarization scrambler, a variable optical attenuator, and an optical switch.

14. The method of claim 7, wherein the spatially non-uniform polarization states are caused by spatially non-uniform birefringent properties.

15. The method of claim 7, further comprising, after said spatial filtering:

detecting a beat signal created by interference of the light beam with the another light beam through a polarizer;

generating control signals to a polarization-altering device to change the polarization states of its output.

16. The method of claim 15, wherein said spatial filtering the light beam comprises filtering at least one of a wavefront of the light beam and an amplitude of the light beam.

17. The method of claim 16, wherein said filtering a wavefront of the light beam comprises passing the light beam through a spatial filter selected from the group consisting of a polarization-maintaining single-mode fiber, a single-mode fiber, a planar waveguide, and an integrated optics waveguide.

18. The method of claim 16, wherein said filtering an amplitude of the light beam comprises passing the light beam through aperture.

19. The method of claim 15, wherein said changing a polarization state of a light beam comprises passing the light beam through a birefringent material.

20. The method of claim 19, wherein the birefringent material is selected from the group consisting of a liquid crystal, an electro-optic crystal, and a photoelastic modulator.

21. The method of claim 15, wherein said changing a polarization state of a light beam comprises passing the light beam through a polarization-altering device selected from the group consisting of a polarization controller, a polarization state modulator, a polarization scrambler, a variable optical attenuator, and an optical switch.

22. The method of claim 15, wherein the spatially non-uniform polarization states are caused by spatially non-uniform birefringent properties.

* * * * *